United States Patent [19]

St. Louis et al.

[11] Patent Number: 5,714,097
[45] Date of Patent: *Feb. 3, 1998

[54] PACKING

[75] Inventors: Daniel M. St. Louis, West Bloomfield, Mich.; Ko C. Lang, Westlake Village, Calif.

[73] Assignee: Lantec Products, Inc., Agoura Hills, Calif.

[*] Notice: The term of this patent shall not extend beyond the expiration date of Pat. No. 5,498,376.

[21] Appl. No.: 533,559

[22] Filed: Sep. 25, 1995

Related U.S. Application Data

[62] Division of Ser. No. 147,806, Nov. 3, 1993, Pat. No. 5,498,376.

[51] Int. Cl.$^6$ .......................... B01D 47/00; F02M 29/04
[52] U.S. Cl. ........................ 261/113; 261/DIG. 72
[58] Field of Search ............................... 261/113, 110, 261/108, DIG. 72

[56] References Cited

U.S. PATENT DOCUMENTS

| | | | |
|---|---|---|---|
| 2,424,248 | 7/1947 | Melvill | 261/DIG. 72 |
| 2,615,699 | 10/1952 | Dixon | 261/DIG. 72 |
| 3,752,453 | 8/1973 | Doyne | 261/94 |
| 4,203,934 | 5/1980 | Leva | 261/98 |
| 5,017,309 | 5/1991 | Peterson | 261/111 |
| 5,304,328 | 4/1994 | Dolan | 261/DIG. 72 |
| 5,314,645 | 5/1994 | Rukovena | 261/94 |
| 5,458,817 | 10/1995 | Lang | |

FOREIGN PATENT DOCUMENTS

| | | | |
|---|---|---|---|
| 2942481 | 4/1981 | Germany | 261/DIG. 72 |
| 55-167021 | 12/1980 | Japan | 261/DIG. 72 |
| 570387 | 8/1977 | U.S.S.R. | 261/DIG. 72 |
| 1487959 | 6/1989 | U.S.S.R. | 261/DIG. 72 |

OTHER PUBLICATIONS

Koch Engineering Company Inc., "Flexisaddles", Aug. 21, 1975.

*Primary Examiner*—Khanh P. Nguyen
*Attorney, Agent, or Firm*—Marvin E. Jacobs

[57] ABSTRACT

An improved packing body is formed by forming a first end wall of a perforated strip into an interior convolution surrounded by a peripheral convolution containing the second end wall of the strip. The convolution may be in spiral form or concentric polygons such as cylinders joined by connector segments. Baffle elements can project from the surface of the strip at an angle to the longitudinal axis of the packing body. Tapered strip with the large end wall disposed to the interior can be bent into a shape approaching spherical.

6 Claims, 2 Drawing Sheets

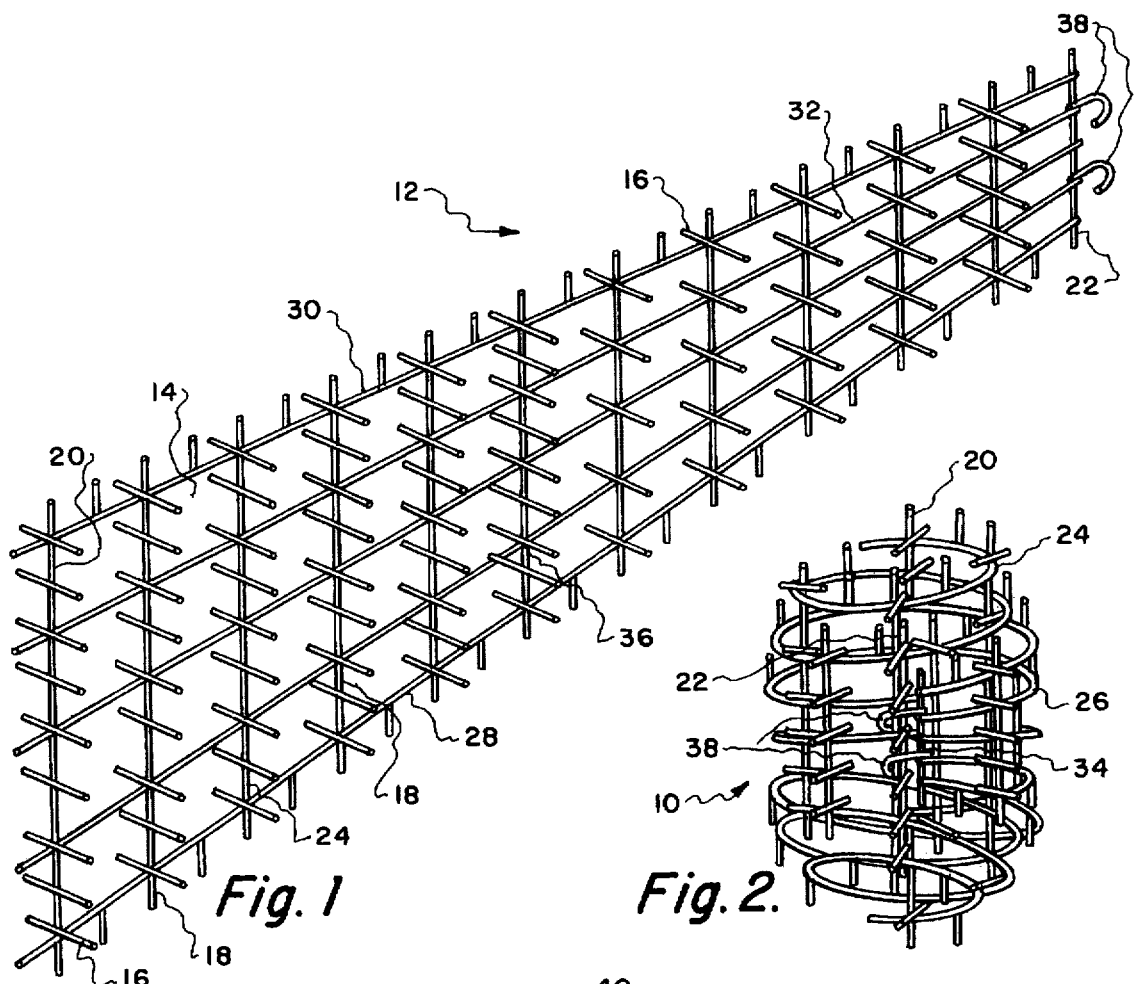
Fig. 1
Fig. 2
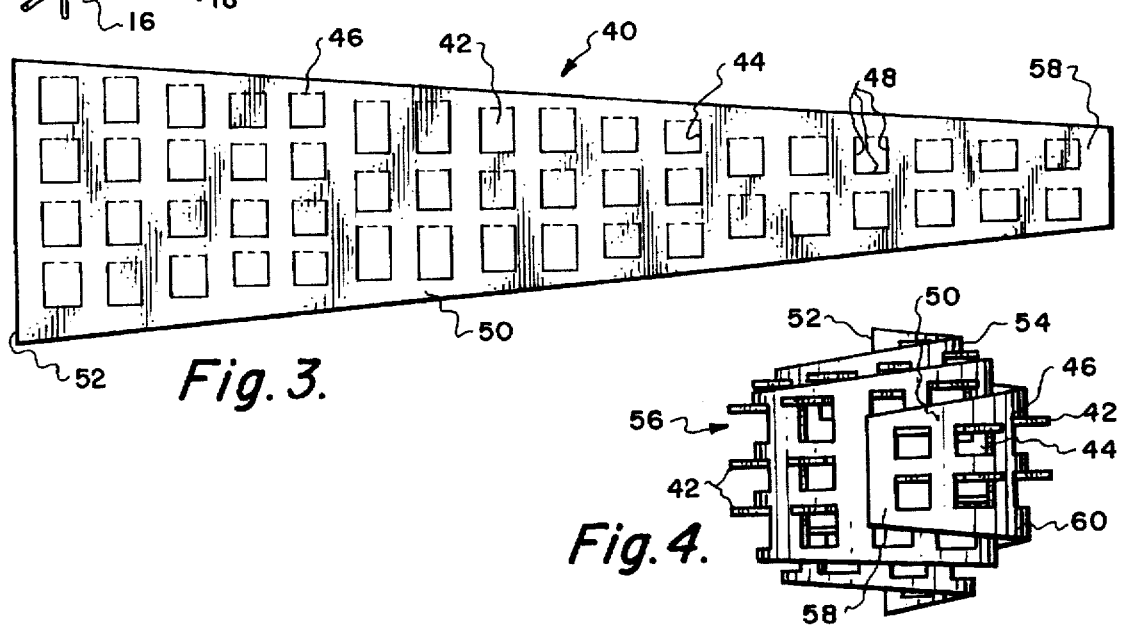
Fig. 3
Fig. 4

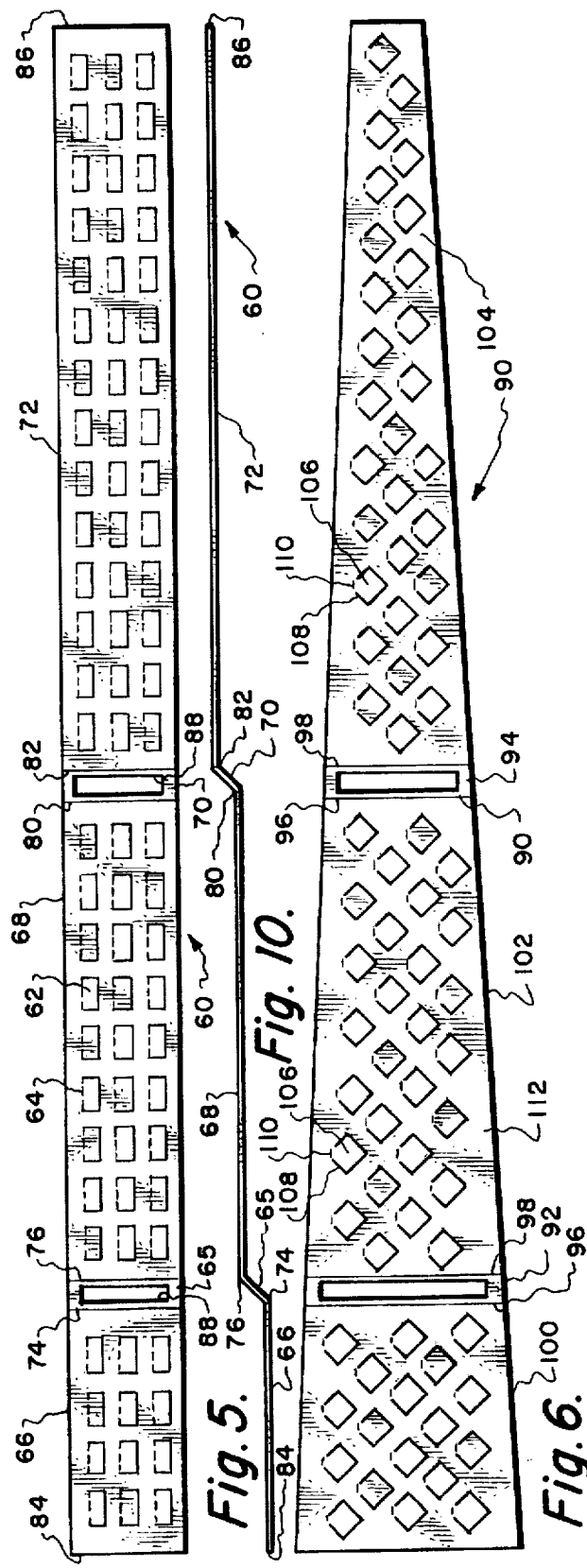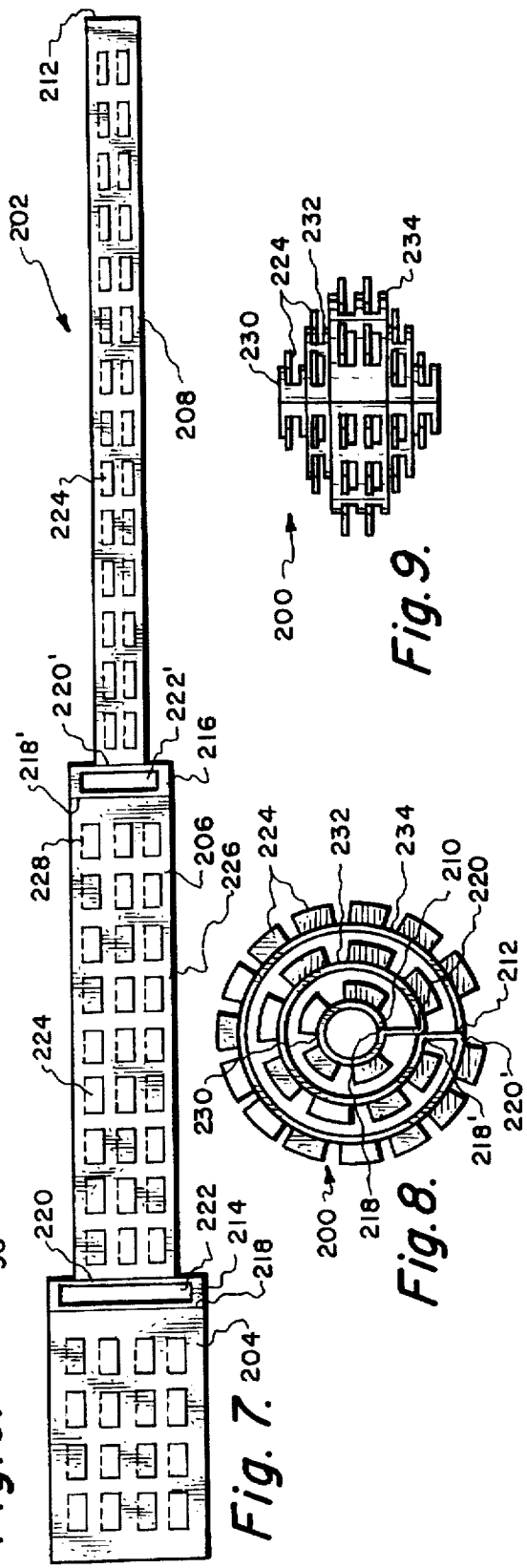

1
PACKING

This is a Division of application Ser. No. 08/147,806, filed Nov. 3,1993 now U.S. Pat No. 5,498,376.

TECHNICAL FIELD

The present invention relates to packing elements for use in packed towers and, more particularly, this invention relates to a simple method of manufacturing packing elements having complex shapes not limited by consideration of release from a mold.

BACKGROUND OF THE INVENTION

Packed towers are used for mass transfer operations such as absorption, desorption, extraction, scrubbing and the like. The type of packing is chosen for its mechanical strength, resistance to corrosion, cost, capacity and efficiency. The function of the packing is to facilitate mass transfer between two fluid streams, usually moving countercurrent to each other. Efficiency and rate of mass transfer are enhanced by providing large surface area in the packing to facilitate contact of the fluids and by breaking the liquid into very fine droplets to enhance mass transfer to a gas phase.

Packing can be in the form of trays or packing bodies that are randomly packed into a column or tower. Originally, packing elements were ceramic or carbon rings, saddles, partition rings or drip point tiles. More modern packing bodies have a uniform distribution of open cellular units and provide higher efficiency and performance. They have very high wettable surface area and low resistance to fluid flow. They are effective in any orientation. The high efficiency packing bodies can be dump loaded into a column or tower and result in uniform distribution of the packing bodies without having blocked regions or void regions. These packing bodies permit streams to be processed at faster volumetric rates. Efficiency is increased and processing cost is reduced. The high efficiency packing bodies have complex dimensional shapes, usually with numerous struts and projections of different sizes and disposed at different angles and positions throughout the packing body.

However, the intricate structure of the uniform geometric shapes required for the high efficiency packing bodies requires that they be formed by casting, injection molding, stamping or extrusion, all expensive processes. Extrusion processes are limited since they generally are used to form shapes with axial symmetry. Also molding processes forbid the use of shapes such as undercuts and overlapping shapes since they cannot be released from ordinary molds. Multi-part molds are prohibitively expensive. Thus, much of the internal volume is open space decreasing effective surface area. Baffle structure perpendicular to the longitudinal axis of the packing body is less than the optimum.

Metal packing bodies or elements are required for certain high temperature or chemically aggressive process streams. Most metal packing bodies are formed from metal blanks rolled into a tubular or spherical shape. Tabs or tongues may be cut and bent toward the interior to provide projections to increase surface area and enhance mixing and droplet formation. Again, there is substantial open area and efficiency is less than desired.

U.S. Pat. No. 4,724,393 describes an improved method for manufacturing high performance, symmetrical, open volumed packing bodies. The packing bodies have uniform geometrical configurations and are formed from a wide variety of materials into a wide variety of shapes and geometries. The process is simple and economical. A strip of sheet material has a pattern of repeating plates which are connected by intermediate ribbons of the sheet material. The plates may be perforated or contain projections. The plates are bent perpendicular to the longitudinal axis of the strip. The intermediate ribbons are then bent to bring the longitudinal axis of the bent plates into close proximity and in substantial parallel alignment.

The high performance packing bodies have performed well and have captured a significant share of the market. They have been manufactured in plastic or metal materials. These packings have low pressure drop, high mass transfer and packing efficiency. They have a high population of drip points per volume provided by a uniform distribution of surface elements. An open, non-obstructive structure provides low pressure drop while dispersing and distributing flow in both longitudinal and lateral directions.

While the void volume of the interior structure of the packing body is less than prior high efficiency packing bodies, the structure normal to the longitudinal axis is still difficult to provide and the manufacture requires several bending and rolling operations to form the sheet material into an element.

STATEMENT OF THE INVENTION

Packing bodies with more complex shapes are produced in a more simplified manner in accordance with the invention. The packing bodies provide efficient mixing of the streams and turbulence in the fluids flowing around and through them. The process of the invention also starts with a strip of flexible material. However, instead of bending the material, the strip of material is rolled such that a first curved end is disposed with in an outer curved portion containing the second end. Latching means secure the second end to the outer curved end.

The strip has a high degree of open space provided by perforations, at least about 30% of the strip is open space, preferably from 50% to 90% of the strip is open space. Baffle tabs are attached to the strip. The tabs provide increased surface for fluid contact. If the tabs are at an angle to the longitudinal axis of the rolled packing body they could be in the path of the flow liquid and will act to disrupt the liquid into smaller droplets. The tabs can be any shape such as curved, rectangular, triangular, square, etc. The tabs can be formed by cutting a partial perimeter of the tab from the sheet material leaving a live hinge. The live hinge is then bent to dispose the tab away from the sheet. A strip could also be molded with tabs raised from the surface of the strip. The raised tabs simultaneously form apertures in the sheet. The tabs can also act as spacers between adjacent arcuate sections of the rolled strip. The tabs can face upwardly and/or downwardly. The tabs can be disposed normal to the surface of the sheet or at a lesser or greater angle, usually from 20 degrees to 160 degrees.

The strip can be formed into a rolled packing body by engaging the first end of the strip in a slot on a rod and rotating the rod to twist the strip into a structure in which a curved portion containing the first end is surrounded by a curved portion containing the second end of the strip. The tabs can be partially bent outward from the strip and as the strip is rotated past a pressure plate, the plate bends the tabs into position.

The strip is formed of a material that has a flexible and bendable first state such as metal, B-stage thermosetting resins, thermoplastic resins or ceramic precursors such as metal oxides dispersed in organic binder resin. The strip can be formed by stamping, cutting and bending operations with metal strips or certain plastic strips. Other strips can be formed by casting, molding or extrusion of ceramic or resin materials. After the rolled strip is in its final configuration, the rolled strip can be fired to cure the resin or convert the precursor to a final ceramic state.

The packing body of the invention can be produced from much simpler starting materials. Even if molds are used to form the strips, the molds are much cheaper and simpler than molds used to form prior high performance packing bodies. The method of the invention can be used to form packing bodies in complex shapes that can not be practically made by other techniques. The packing bodies of the invention can be produced at much lower costs and can be made from plastic, metal or ceramic.

These and many other features and attendant advantages of the invention will become apparent as the invention becomes better understood by reference to the following detailed description when considered in conjunction with the accompanying drawings.

BRIEF DESCRIPTION OF THE DRAWINGS

FIG. 1 is a perspective view of a first embodiment of a strip for forming a packing body according to the invention;

FIG. 2 is a side view in elevation of the strip of FIG. 1 rolled into a spiral packing body;

FIG. 3 is a view of a tapered strip precut with a pattern of bendable tabs;

FIG. 4 is a side view in elevation of the tapered strip of FIG. 3 rolled into a spiral packing body;

FIG. 5 is a top view in elevation of an embodiment of a strip for forming a packing body with coaxial convolutions;

FIG. 6 is a top view in elevation of another embodiment of a strip for forming a packing body with concentric structures;

FIG. 7 is a top view in elevation of a further embodiment of a strip for forming a packing body with concentric rings;

FIG. 8 is a top view in elevation of the packing body shown in FIG. 9;

FIG. 9 is a side view in elevation of the strip of FIG. 7 rolled into a packing body; and FIG. 10 is a side view of the strip shown in FIG. 5.

DETAILED DESCRIPTION OF THE INVENTION

Referring now to FIGS. 1 and 2, the improved packing body 10 is formed of a strip 12 having at least 30% open space provided by apertures 14. The strip 12 may also include baffle elements 16 that project from the surface 18 of the strip 12 such as rod like struts. The strip is continuous from a first end wall 20 to a second end wall 22. A packing body 10 is formed by engaging either end wall of the strip in a slot of a slotted rod and rotating the rod to form an inner convolution 24 containing the first end wall 20 and an outer convolution 26 containing the second end wall 22.

The strip 10 has side walls 28, 30, longitudinal stringers 32 and cross-spars 34. Each stringer 32 is joined to the end walls 20, 22 and to each cross spar 34 at the intersection 36 therewith. Each cross-spar is also joined to each side wall 28, 30. The struts 16 may attached to the intersections 36 and/or to the cross-spars 34 or stringers 32 intermediate their intersections. A plurality of the rod-like struts extend from both surfaces of the strip 10. If the strip is formed of resilient material, latching means such as hooks 38 may be attached to the second end wall 22. When the hooks 38 engage a cross-spar 34 on the outer convolution 26, unravelling of the packing element 10 is prevented.

The length and width of the strip 12 are determined by the diameter and height desired for the packing body 10, the spacing between convolutions, and the surface area. Packing bodies generally have a diameter from 1 to 5 inches and height is about 1 to 4 inches. Usually the diameter to height ratio is about equal. A packing body will generally have a packing factor from about 5 to 65 per foot and a surface area from about 10 to 80 ft$^2$/cu.ft.

The width of the strip at its widest dimension corresponds to the height of the packing body. Generally, the strip will be at least 5 inches long up to 50 inches or more. The spacing between convolutions depends on the height of the baffle elements. Generally, the baffle elements have a height from $\frac{1}{16}$ to $\frac{3}{8}$ of an inch. The packing body will have at least 2 convolutions preferably from 3 to 15 convolutions.

The strip can be in the form of a rectangle having parallel side walls or the strip can have shaped sided walls such as convex, concave, patterned or converging. The strip can also be crenelated If the side walls of the strip are parallel, the strip will wind into a cylindrical-shaped body. If the strip has tapered side walls, it will roll into a cylinder if the smaller end wall is disposed to the interior and into a hexagon shaped body if the larger end wall is disposed to the interior of the packing body 10 as shown in FIG. 2.

The strip shown in FIGS. 1 and 2 has a very open structure like a mesh or a screen. In the embodiment shown in FIGS. 3 and 4, the strip 40 is formed of sheet material. The baffle elements 42 and the apertures 44 can be formed by stamping and bending appropriate materials such as metal, certain plastics and certain precursor ceramics or they can be formed by molding in simple molding cavities or by casting. The apertures 44 are preferably formed by sheet material raised from the surface along connection line 46 to form the baffle element 42. In the case of bendable materials, the baffle element 42 is bent along line 46 to form the aperture 44.

In FIG. 3, the baffle elements 42 are shown with cut lines 48 along 3 sides joining bend line 46 which is parallel to the longitudinal axis of the strip 40. In FIG. 4 the baffle elements 42 are shown bent away from the surface 50 of the strip 40. The tapered strip 40 is rolled with the wider first end 52 end forming a first convolution 54 at the interior of the packing body 56 and the second narrower end 58 forms an outer convolution 60 at the outer periphery of the packing body 56.

The strip 60 shown in FIGS. 5 and 10 is rectangular and will roll into a cylindrical-shaped packing body. The strip 60 contains a uniform pattern of apertures, not shown, formed by baffles 62 raised from the surface along lines 64. Instead of forming a continuous spiral when rolled, the strip 60 contains a spacing-connection segment 65 connecting region 66 to region 68 and a spacing-connection segment 70 connecting region 68 to region 72. The segments can be prebent as shown in FIG. 10 to displace the regions 66, 68, 70, into 3 elevations in a molding or bending operation. The first smaller region 66 is first wound. Segment 65 is disposed at an angle away from the first convolution along fold line 74 and at a second angle along fold line 76. The second region 68 is then wound into a second convolution. Segment 70 which is bent along fold lines 80 and 82 displaces the second convolution from the longest third region 72 which is wound last into a third peripheral convolution. First end wall 84 is disposed to the interior and second end 86 is present on the periphery of the final packing body. Each region may be wound into an individual spiral or each region may be wound into a single polygon such as a cylinder similar to the packing body 200 shown in FIGS. 8 and 9. In the case of cylinders the diameter of each cylinder is the length L, divided by π. Slots 88 maybe provided in the spacer-connection segments 64, 70 to provide open space or to receive a tab, not shown, to maintain each region in convoluted form. Other fastener means may be utilized to close the cylinders, if needed, such as studs, adhesives or thermal bonding of metals or thermoplastic resins.

The strip 90 shown in FIG. 6 is tapered. It also has segments 92, 94 with bend lines 96, 98 separating the regions 100, 102 and 104. The baffle elements 106 are rectangular with the sides rotated 45° with respect to the longitudinal axis of the strip 90. The four sides of the baffle elements are cut along lines 108 leaving a top or bottom corner 110 uncut to act as a mounting for the baffle element 106 as it is raised from the surface 112 of the strip 90.

FIG. 7-9 illustrate a further embodiment of a strip 202 having multiple regions 204, 206, 208. The regions are each rectangular and each step down in width from region 204 at a first end wall 210 of the strip to the region 208 at the second end wall 212 of the strip 202. The strip 202 includes spacer segments 214, 216, each having a first fold line 218 and a second fold line 220 separating the regions 204, 206, 208. Each segment may contain a slot 222.

The baffles elements 224 may be molded in raised position or bent upwardly from the surface 226 along bend lines 228 to form apertures, not shown. The region 204 is then wound into a first inner cylinder 230 in which the first end wall 210 joins the first fold line 218 to close the cylinder. A second wider cylinder 232 starts at fold line 220 and ends at fold line 218'. The third widest cylinder 234 starts at fold line 220' and ends with second end wall 212 adjacent the fold line 220'.

The invention provides high performance packing bodies in complex shapes by simple, low cost fabrication techniques. The intricate shapes are defined in planer materials readily formed by casting, molding, stamping or extrusion. The manufacture is completed by a winding step.

It is to be realized that only preferred embodiments of the invention have been described and that numerous substitutions, modifications and alterations are permissible without departing from the spirit and scope of the invention as defined in the following claims.

We claim:

1. A packing body for use for fluid contact comprising in combination:

an elongated, molded strip formed of a flexible, synthetic resin having a first surface, a second surface, a first end wall and a second end wall, said strip being formed of parallel, spaced axial members and parallel, spaced cross members joined to form apertures providing at least 30% open space, the width of said strip decreasing from the first end wall to the second end wall;

said strip being in the form of a coil having a plurality of convolutions with said first end wall being part of a first curved portion of the strip and being disposed within the interior of the coil and the second end wall being part of a second curved portion of the strip and forming the exterior of the coil;

spacer means for maintaining separation between adjacent convolutions;

rod-like elements molded integrally with said axial and cross members, said rod-like elements projecting away from both surfaces of the strip; and in which the width of the strip increases or decrease from the first end wall to the second end wall, axial members and cross members form intersections and said rod-like elements are attached to said intersections and to the members intermediate said intersections.

2. A packing body according to claim 1 in which the coiled strip is in the form of a spiral.

3. A packing body according to claim 1 further including means for latching the second end wall to the next adjacent convolution.

4. A packing body according to claim 1 having 50% –90 open space.

5. A packing body according to claim 1 having a packing factor of about 5 to 65 per foot and a surface area of about 10 to 80 ft²/cuft.

6. A packing body according to claim 5 having from 3 to 15 convolutions.

* * * * *